United States Patent
Keppler et al.

(10) Patent No.: US 8,170,054 B2
(45) Date of Patent: *May 1, 2012

(54) SOFTWARE CONTROL OF HALF DUPLEX RADIO DATA TRANSCEIVERS

(75) Inventors: David Keppler, Clinton, NY (US); Nathan Lutchansky, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 831 days.

This patent is subject to a terminal disclaimer.

(21) Appl. No.: 12/313,790

(22) Filed: Nov. 21, 2008

(65) Prior Publication Data

US 2009/0111498 A1   Apr. 30, 2009

Related U.S. Application Data

(63) Continuation of application No. 11/007,774, filed on Dec. 8, 2004, now Pat. No. 7,630,395.

(60) Provisional application No. 60/573,984, filed on May 24, 2004.

(51) Int. Cl.
*H04L 12/66* (2006.01)

(52) U.S. Cl. ........ 370/463; 370/328; 370/412; 455/518; 455/557

(58) Field of Classification Search ................ 370/463, 370/445, 328, 412; 455/518, 557; 380/270

See application file for complete search history.

(56) References Cited

U.S. PATENT DOCUMENTS

| | | | | |
|---|---|---|---|---|
| 4,521,882 A * | 6/1985 | Gabrielli et al. | ............... | 370/445 |
| 5,182,746 A * | 1/1993 | Hurlbut et al. | ................ | 370/463 |
| 6,295,284 B1 * | 9/2001 | Maggenti | ..................... | 370/328 |
| 6,912,401 B2 * | 6/2005 | Rosen et al. | ................... | 455/518 |
| 2004/0179689 A1 * | 9/2004 | Maggenti et al. | ............ | 380/270 |

* cited by examiner

*Primary Examiner* — Kwang B Yao
*Assistant Examiner* — Vincelas Louis
(74) *Attorney, Agent, or Firm* — Joseph A. Mancini (57) ABSTRACT

Apparatus and method for providing a data interface to a plurality of radio transceivers such as between a personal computer or other information processing device to one or more radio transmitter/receiver systems having a serial data interface in a manner that provides control of the radio and means to send and receive data via the radio without regard to the characteristics of the radio or its serial interface. A common control protocol is employed that exposes the functionality necessary to control the radio transmitter/receiver device in a generic manner. The invention may communicate with the data terminal equipment via a widely-available data interface or network protocol, such as an asynchronous serial interface, the Universal Serial Bus (USB), or an Internet Protocol (IP) network. The invention also provides a means of implementing synchronous serial framing formats through software implementation, allowing compatibility with future data systems to be achieved without requiring hardware modifications.

5 Claims, 10 Drawing Sheets

SOFTWARE CONTROL OF HALF DUPLEX RADIO DATA TRANSCEIVERS

PRIORITY CLAIM UNDER 35 U.S.C. §119(e)

This patent application claims the priority benefit of the filing date of a provisional application Ser. No. 60/573,984, filed in the United States Patent and Trademark Office on May 24, 2004.

CROSS-REFERENCE TO RELATED APPLICATIONS

The present application is a divisional application of and claims priority from related, and commonly assigned U.S. patent application Ser. No. 11/007,774 filed on Dec. 8, 2004, now U.S. Pat. No. 7,630,395 entitled "Apparatus and Method for Providing a Data Interface to a Plurality of Radio Transceivers" also by David Keppler and Nathan Lutchansky. Accordingly, U.S. patent application Ser. No. 11/007,774 is herein incorporated by reference.

STATEMENT OF GOVERNMENT INTEREST

The invention described herein may be manufactured and used by or for the Government of the United States for governmental purposes without the payment of any royalty thereon.

BACKGROUND OF THE INVENTION

Radio transmitter/receiver systems designed and built since the 1950's often include data communications capabilities in addition to or instead of voice/audio communications capabilities. The most common interface for connecting data communication equipment (DCE) like radio transmitters and receivers to data terminal equipment (DTE) such as personal computers is the serial interface, defined by the Electronics Industry Alliance (EIA) standards RS-232, RS-422, RS-530, and others.

Serial interfaces provide a common electrical interface for sending and receiving streams of data as a sequence of voltage levels in which one voltage level indicates a digital one (1) and a different voltage level indicates a digital zero (0). Some serial interfaces, known as synchronous serial interfaces, provide timing information in the form of a separate clock signal by which the transmitter and receiver synchronize the rate at which data flows through the interface. Asynchronous serial interfaces do not have this separate clock signal and rely on oscillators within each device to maintain implicit timing. Serial interfaces may also contain separate control signals to provide status information, enable and disable the flow of data, and/or manipulate the state of the DCE.

Radio transmitter/receiver systems in use today may implement any one of a wide range of different serial standards and configurations, but the most common DTE in use today is the personal computer (PC) which only provides an asynchronous RS-232 interface. As a result, PCs are unable to utilize many radio transmitter/receiver systems that provide a serial interface based on a different standard, and are unable to take advantage of advanced wireless communications protocols that require a synchronous serial interface between the PC and the radio.

To alleviate this incompatibility, specialized hardware in the form of add-on boards is commercially available that augments standard PCs with additional serial interfaces that are compatible with some radios. However, this hardware is only compatible with a limited number of commonly-used radios, and the add-on boards are specific to the form-factor of the PC, depending on whether the PC is intended for a desktop, industrial, or mobile environment.

Interfacing with radio transmitter/receiver systems using serial links also imposes additional restrictions on the DTE. Most radio equipment operates only in a half-duplex mode, in which a radio device is unable to transmit and receive simultaneously. The DTE must control the direction of data exchange by manipulating the "push-to-talk" (PTT) control signal on the serial interface to activate and de-activate the transmitting circuitry on the radio device. Further, many radio transmitters impose additional time delay requirements when transitioning between transmit and receive mode; for example, a transmitter may require several hundred milliseconds for the amplifiers to ramp up to full power before data may be sent, or the data modulator may require a short delay to finish flushing all of the data to be transmitted out of the internal buffers. These timing requirements often necessitate custom software on the DTE that is specific to the serial interface circuitry and/or radio system.

For some uses, particularly in the military environment, a single PC must be able to interface with multiple radios to provide services that translate between or aggregate the communications capabilities of multiple radio links. These radios are often located distant from one another due to antenna positioning requirements, physical space constraints, or safety reasons. Standard serial interfaces typically frustrate the implementation of such multi-radio systems due to the high cost and technical difficulty of extending serial links more than a few feet from the DTE to the DCE. Providing a simple and low-cost means of extending the range of the link between a PC and a radio would increase the potential capabilities of radio data systems.

Prior art exists that solves some, but not all, of these issues in a limited environment for some radio systems. Remote control units for radios are able to extend the serial link between the DTE and the radio for hundreds of feet or even several miles, but these units are specific to a particular model of radio system and the serial interface is still unlikely to be compatible with a standard PC. Converters are available to interface from certain radio-specific serial interfaces to a common PC serial interface, but these converters prevent the use of more efficient data encoding mechanisms and do not provide a means of extending the distance between DTE and radio.

OBJECTS AND SUMMARY OF THE INVENTION

It is an object of the present invention to provide a method and apparatus for interfacing with radio transmitter/receiver systems having a serial interface that supports a plurality of serial interface standards.

It is a further object of the present invention to provide a method and apparatus for controlling the operation of and sending and/or receiving data to and from a radio transmitter/receiver system through a standard data interface available on common PCs.

It is still a further object of the present invention to provide a method and apparatus for providing a common control protocol to interface with a radio transmitter/receiver system that is independent from the characteristics of the particular radio.

It is yet still a further object of the present invention to provide a method and apparatus for extending access to a radio transmitter/receiver system over long distances by carrying a common control protocol over existing data networks.

An additional object of the present invention is to provide a method and apparatus for encapsulating and decapsulating data that is sent and received via a radio transmitter/receiver system in a plurality of serial formats, where the formats are implemented in general-purpose processing units and can be updated electronically.

The invention disclosed herein provides a method and apparatus for connecting a DTE such as a PC or other information processing device to a radio transmitter/receiver system in a manner that allows the DTE to control the radio and send and receive data via the radio using a common control protocol independent of the type of radio device in use and without regard to the serial interface standard supported by the radio device. The DTE may communicate with the invention via a data interface or network protocol commonly found on PCs, such as an asynchronous serial interface, the Universal Serial Bus (USB), or an Internet Protocol (IP) network.

DETAILED DESCRIPTION OF THE PREFERRED EMBODIMENT

Figure 1:
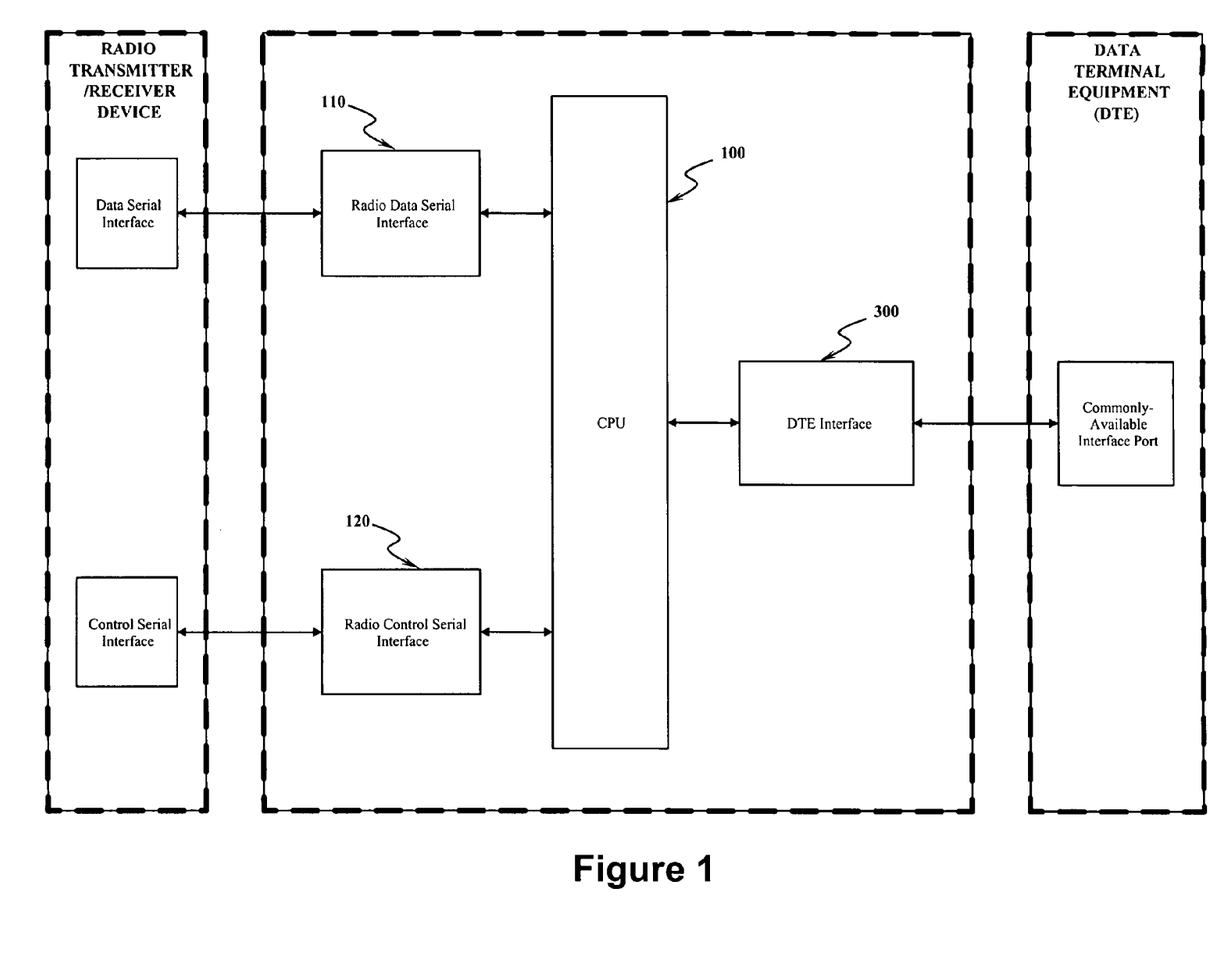
FIG. 1 depicts a block diagram of the components of the invention relative to the systems with which it commonly interfaces.

Referring to FIG. 1, a preferred embodiment of this invention comprises a general-purpose central processing unit (CPU) 100, a radio data serial interface circuit 110, a radio control serial interface circuit 120, and a data terminal equipment (DTE) interface circuit 300.

CPU 100 executes a program that interacts with the DTE through a control channel via the DTE interface 300, with which it exchanges commands using the common control protocol. These commands enable the DTE to pass data through the invention via the radio data serial interface 110 and the radio control serial interface 120 to the radio transmitter/receiver device.

Figure 2:
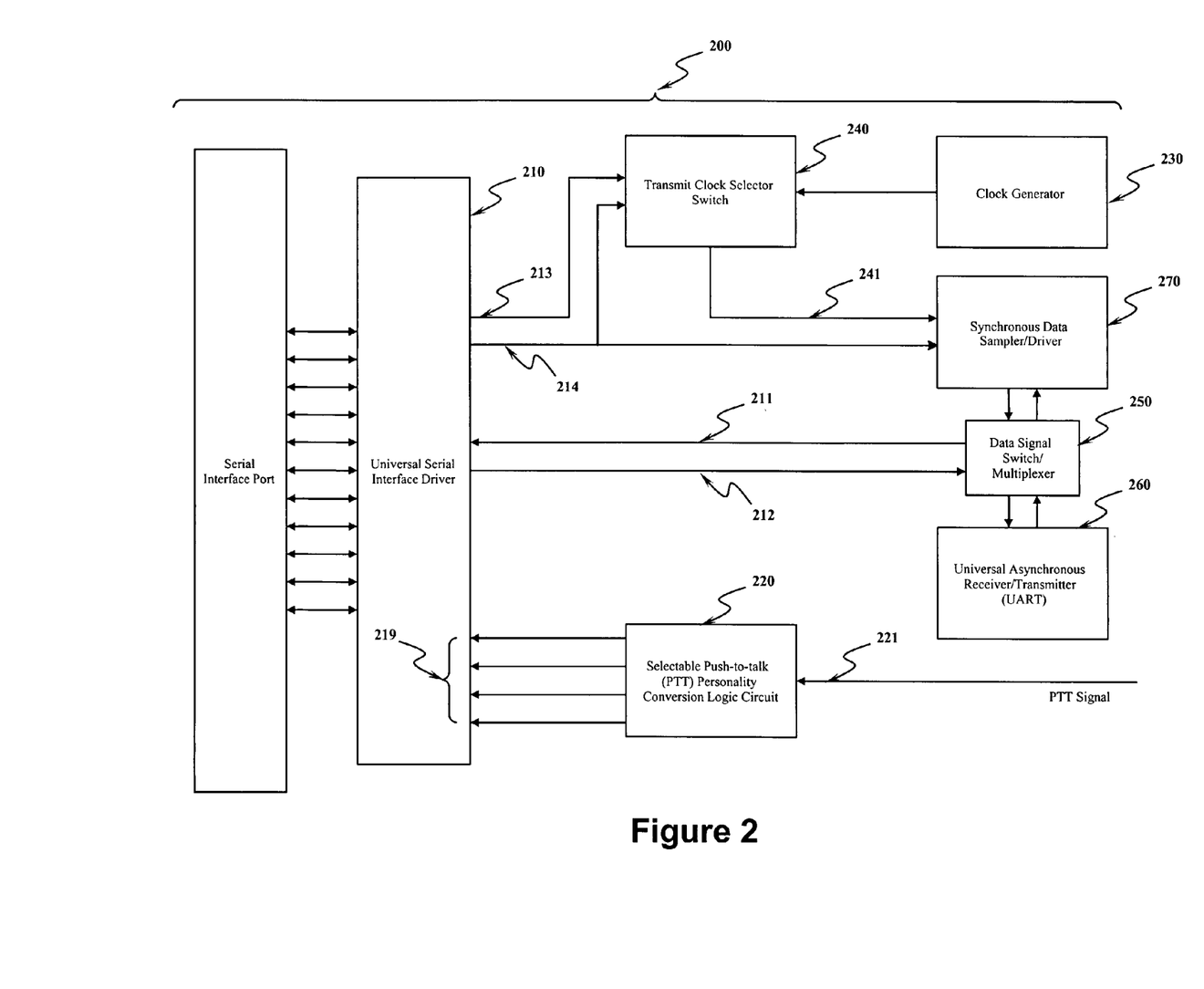
FIG. 2 depicts a detailed block diagram of the invention.

Referring to FIG. 2, serial interface 200 is depicted in detail, showing the components present in both the radio data serial interface 110 and the radio control serial interface 120. Serial interface 200 comprises a universal serial interface driver 210, a selectable push-to-talk (PTT) personality conversion logic circuit 220, a clock generator 230, a transmit clock selector switch 240, a data signal switch/multiplexer 250, a universal asynchronous receiver/transmitter (UART) 260, and a synchronous data sampler/driver 270. The push-to-talk personality conversion logic 220 is not present in the radio control serial interface circuit 120.

Universal serial interface driver 210 converts between one of many selectable serial interface electrical standards and the digital logic levels used by the other components of the invention, providing a means of connecting to data serial interfaces on many types of data radios. Clock generator 230 and transmit clock selector switch 240, when necessary for synchronous operation, provide the selected transmit clock signal 241 for the synchronous data sampler/driver 270, and can source the clock from the serial interface transmit clock signal 213, the serial interface receive clock signal 214, or the clock generator 230. Data signal switch/multiplexer 250 activates either the UART 260 or the synchronous data sampler/driver 270, depending on whether an asynchronous mode or a synchronous mode is selected. UART 260, when active, receives asynchronous, character-framed data from the data signal switch/multiplexer 250 and passes the data by octet to the CPU 100; and receives data to be transmitted from the CPU 100 (see FIG. 1) and transmits it through the data signal switch/multiplexer 250 in character-framed format. Synchronous data sampler/driver 270, when active, receives synchronous data from the data signal switch/multiplexer 250 and passes the data by octet to the CPU 100 (see FIG. 1); and receives data to be transmitted from CPU 100 (see FIG. 1) and transmits it through data signal switch/multiplexer 250. Synchronous data sampler/driver 270 can be updated electronically to support any serial data format. The present embodiment of the invention supports several different formats, including character framing, High-level Data Control Link (HDLC), and a well-known method for framing characters on noisy radio channels. PTT personality conversion logic circuit 220, present only in the radio data serial interface circuit 110, creates a selectable logical mapping between PTT signal 221 supplied by CPU 100 and the control signals exposed on radio data serial interface 219.

Figure 3:
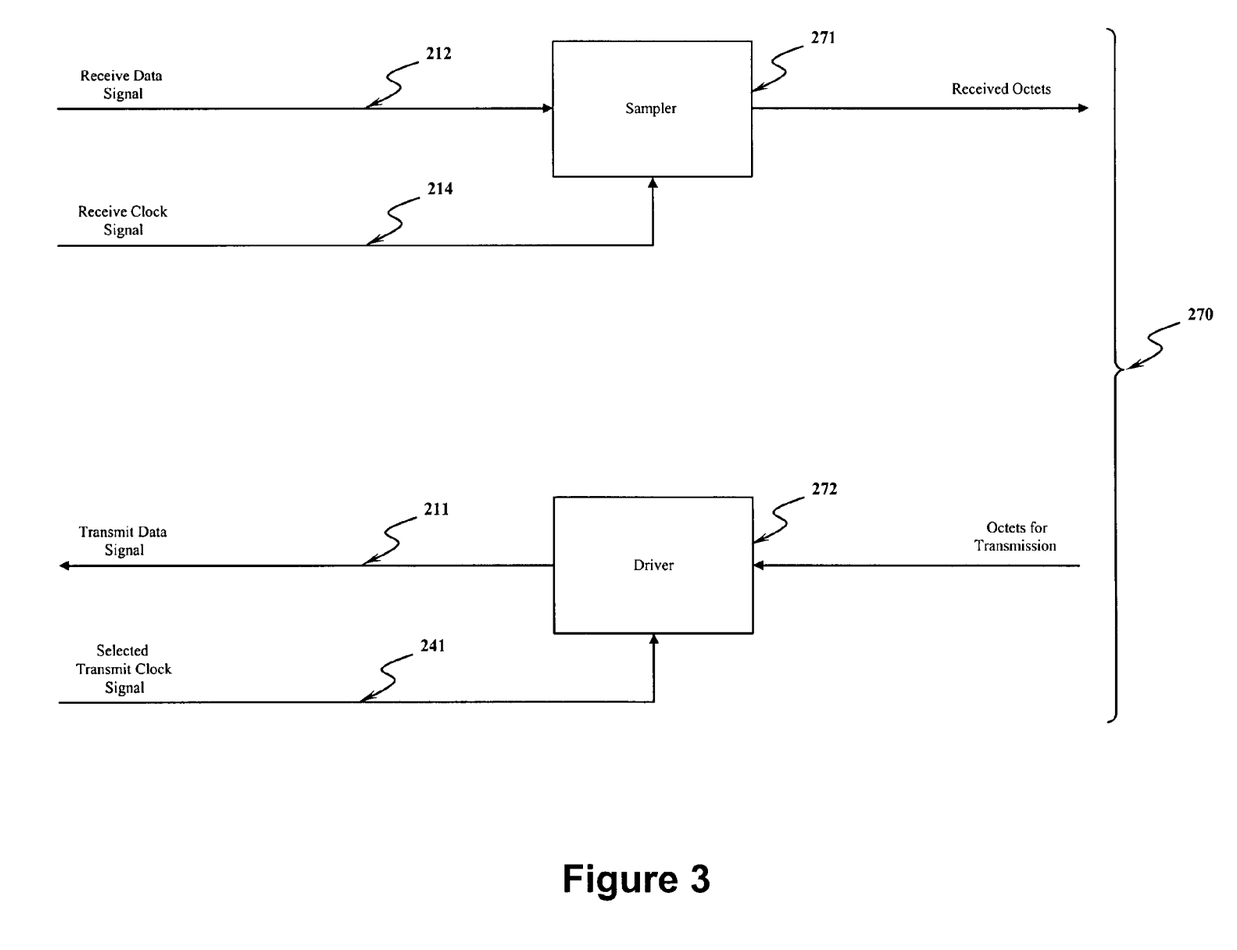
FIG. 3 depicts the synchronous data sampler/driver of the present invention.

Referring to FIG. 3, synchronous data sampler/driver 270 comprises two general-purpose processing units, one of which is sampler 271 and one of which is driver 272. Sampler 271 reads data from serial interface receive signal 212, governed by receive clock signal 214, and converts the signal into octets to be passed to CPU 100 (see FIG. 1) for delivery to the DTE. The driver 272 receives octets from the CPU 100 (see FIG. 1) and sends them in a serial fashion to the serial interface transmit signal 211, governed by the selected transmit clock signal 241. The programs executed by sampler 271 and driver 272 determine the serial data framing and synchronization format implemented by the invention, and thus the invention is able to support new framing formats through a software update without any hardware modifications.

Figure 4:
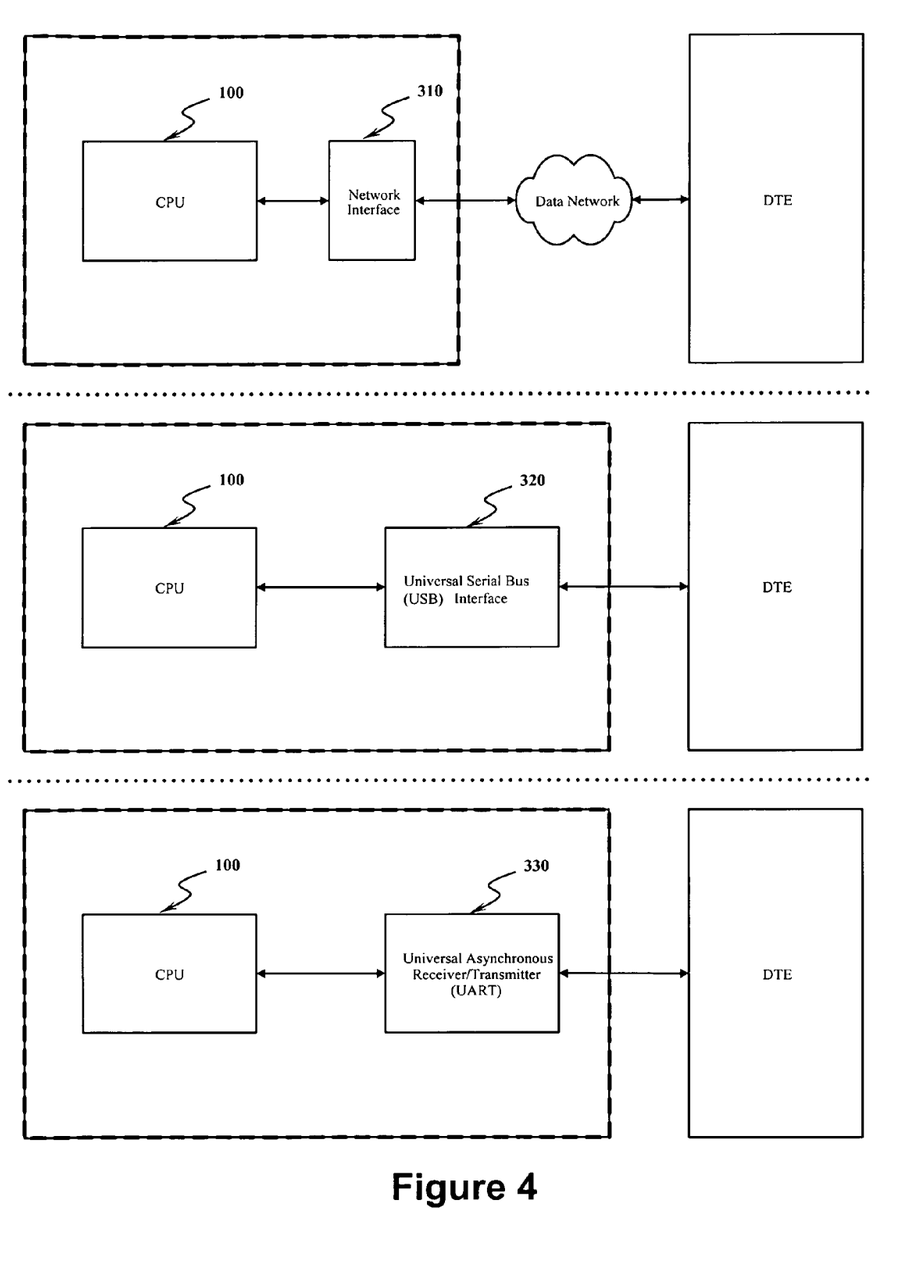
FIG. 4 depicts the DTE interface circuits in three different embodiments of the present invention.

Three methods for interfacing the invention to the DTE are shown in FIG. 4. In one embodiment of the invention, DTE interface 300 (see FIG. 1) is comprised of a network interface 310 used to send and receive data over a data network. The DTE communicates with the invention by establishing a connection using a network protocol such as Transmission Control Protocol/Internet Protocol (TCP/IP), over which it performs commands using the common control protocol.

In another embodiment of the invention, DTE interface circuit 300 (see FIG. 1) is comprised of a Universal Serial Bus (USB) interface 320, which connects to the corresponding USB interface on the DTE. The DTE performs commands using the common control protocol encapsulated within standardized USB protocols.

In yet another embodiment of the invention, DTE interface circuit 300 (see FIG. 1) is comprised of an asynchronous serial port 330, which connects to a serial port on the DTE. The DTE performs commands using the common control protocol on the serial link thus established.

Figure 5:
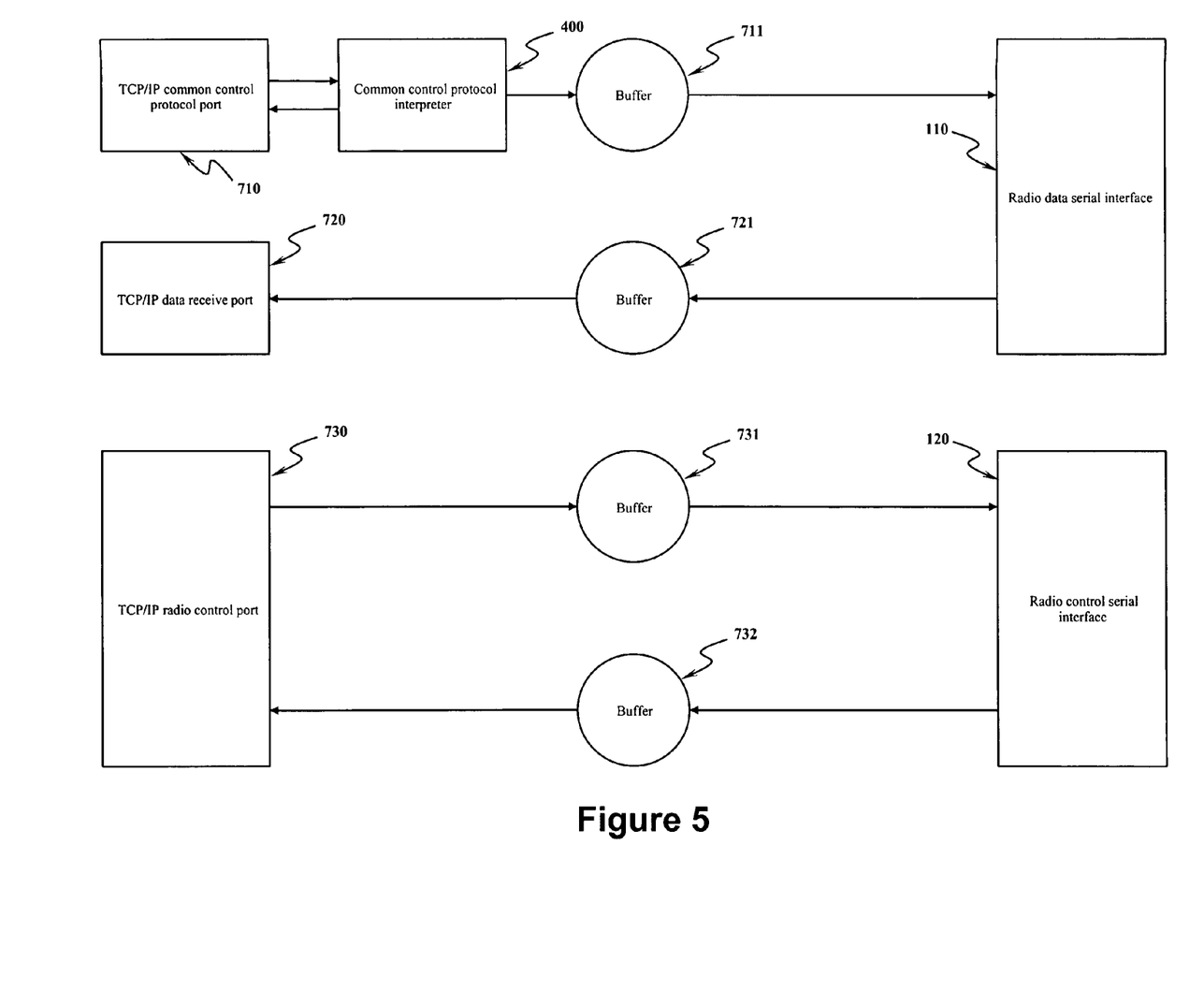
FIG. 5 depicts the flow of data through one of the embodiments of the present invention.

The flow of data through the invention in the first embodiment is shown in FIG. 5. The use of a data network, in this case the Transmission Control Protocol/Internet Protocol (TCP/IP), provides the communications medium between the invention and the DTE, over which the common control protocol and data are carried. Three TCP/IP ports are utilized: bi-directional TCP/IP common control protocol port 710 carries the commands and responses for the common control protocol, including the data to be transmitted via the radio transmitter, between the DTE and common control protocol interpreter 400; uni-directional TCP/IP data receive port 720 which carries the data received by the radio receiver; and bi-directional TCP/IP radio control port 730 which carries the control data between the DTE and the radio transmitter/receiver device control serial port. Buffers 711, 721, 731, 732 are utilized between the serial interfaces 110, 120 and the DTE to accommodate network and DTE timing issues and latency common to PC and data network operation.

Figure 6:
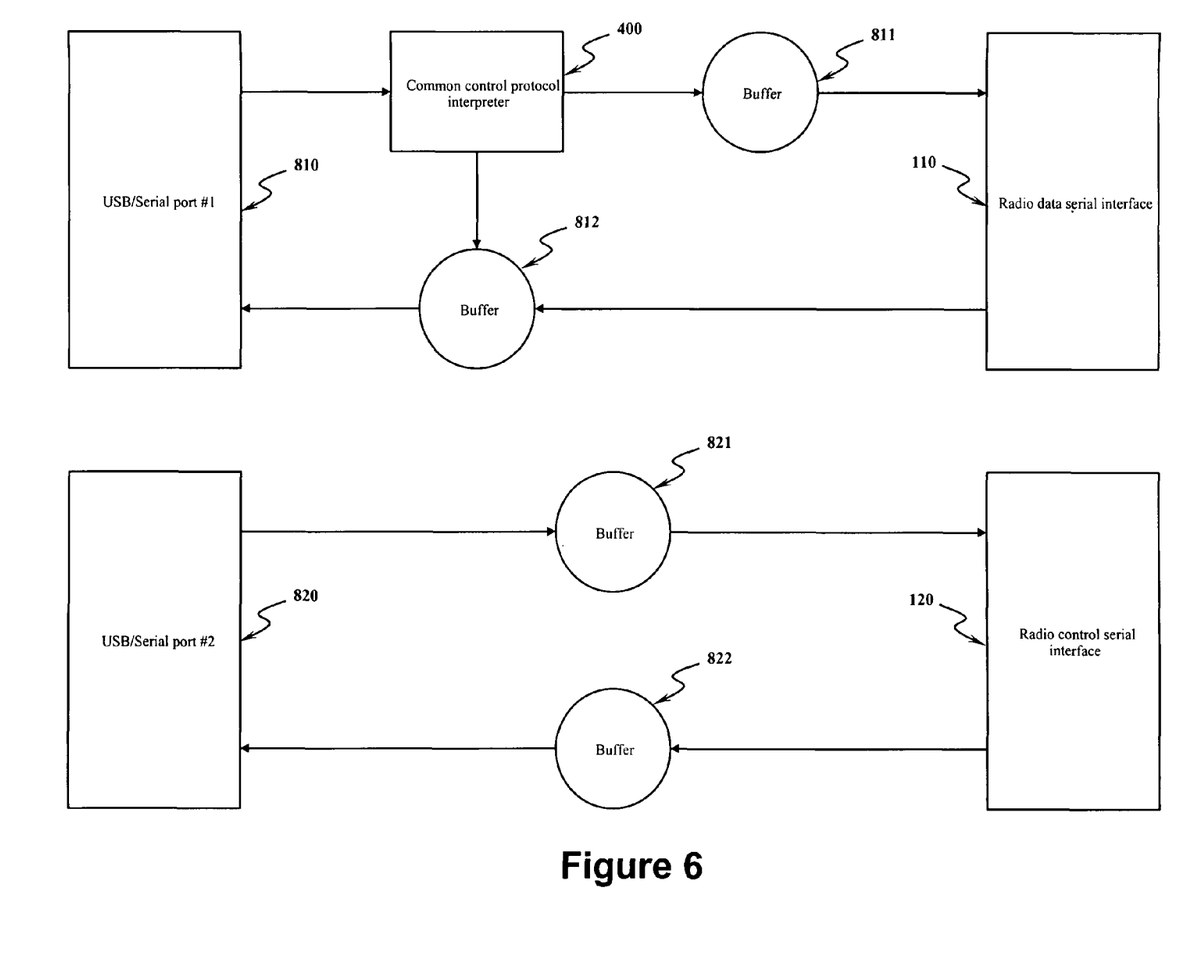
FIG. 6 depicts the flow of data through alternate embodiments of the present invention.

The flow of data through the invention in the second and third embodiments is shown in FIG. 6. The Universal Serial Bus (USB) or asynchronous serial interfaces provide the communications medium for the common control protocol and data, utilizing two physical or logical connections between the invention and the DTE. A first USB/Serial port connection 810 carries the commands and responses for the common control protocol, including the data to be transmitted via the radio transmitter, between the DTE and the common control protocol interpreter 400. This connection also carries the data received by the radio receiver, necessitating the use of a well-known encapsulation mechanism to allow the DTE to separate the protocol responses from the received data. The second USB/Serial port connection 820 carries the control data between the DTE and the radio transmitter/receiver device control serial port. Buffers 811, 812, 821, 822 are utilized between serial interfaces 110, 120 and the DTE to accommodate DTE latency common to PC operation.

Figure 7:
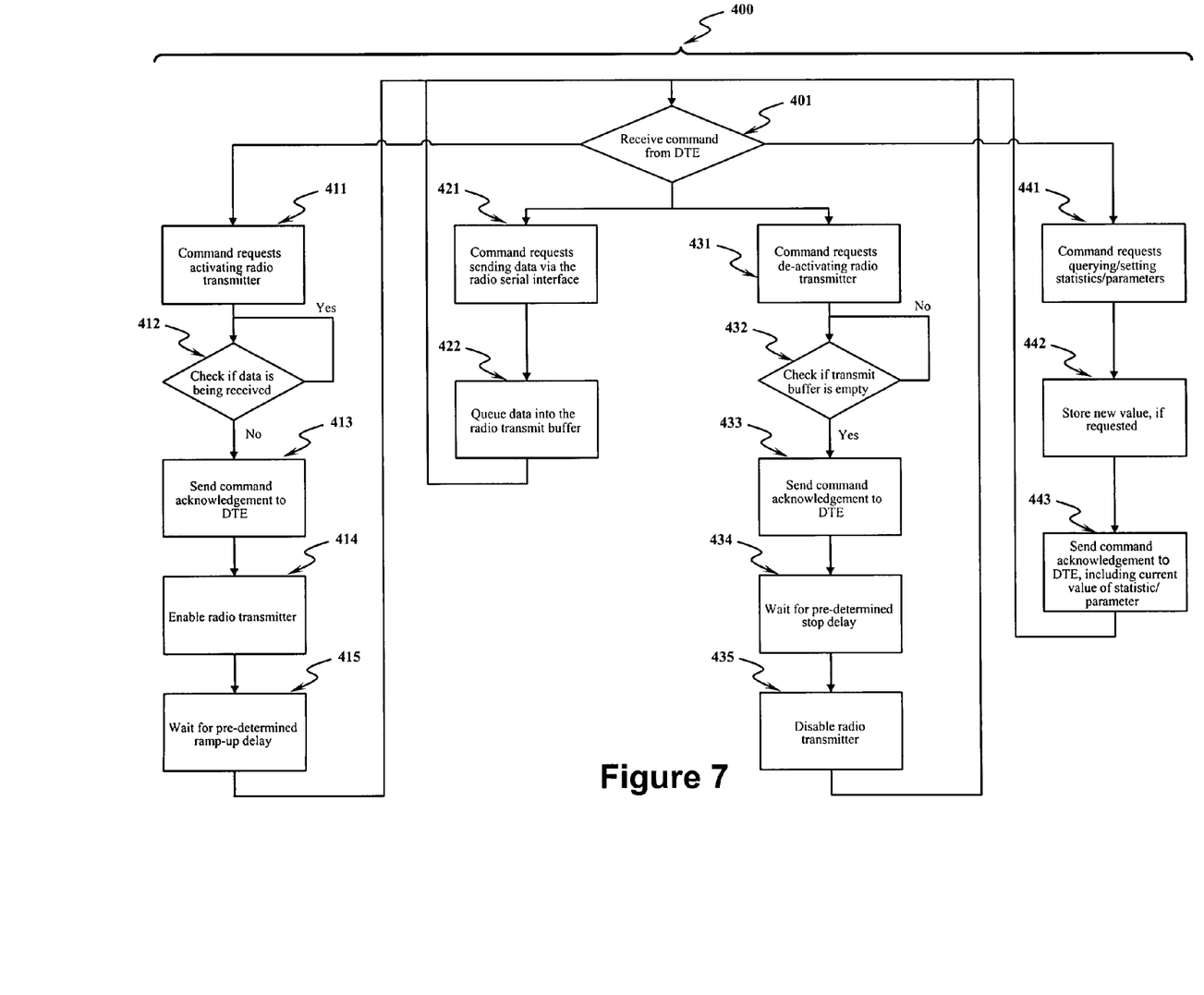
FIG. 7 depicts a flow diagram of the steps for interpreting commands defined in the common control protocol of the present invention.

CPU 100 (see FIG. 1) of the invention executes a program 400, shown in FIG. 7, that processes commands and returns replies formatted in the common control protocol. These commands may cause the radio transmitter to be activated or de-activated, cause data to be sent to the radio data serial interface circuit for transmission via the radio device, or set or retrieve parameters affecting the operation or configuration of the invention. The program normally waits in an idle state for commands to be received 401.

When a command is received to instruct the invention to activate the radio transmitter 411, the invention verifies that the radio device is not currently receiving data 412, sends a response/acknowledgement to DTE 413, activates the PTT signal 414, waits a pre-determined period of time for the radio transmitter to become ready 415, and returns to idle state 401.

When a command is received to instruct the invention to send data via radio 421, the invention copies the specified data from the DTE to the radio data serial interface circuit to be sent by the radio transmitter 422, and returns to an idle state 401.

When a command is received to instruct the invention to de-activate the radio transmitter 431, the invention flushes the remaining data from the transmit buffer 432, sends a response/acknowledgement to the DTE 433, waits a pre-determined period of time for the radio transmitter to become idle 434, de-activates the PTT signal 435, and returns to the idle state 401.

Other commands may allow the DTE to request that the invention query 441 or store 442 configuration parameters or statistics 443 relating to the operation of the invention.

Figure 8:
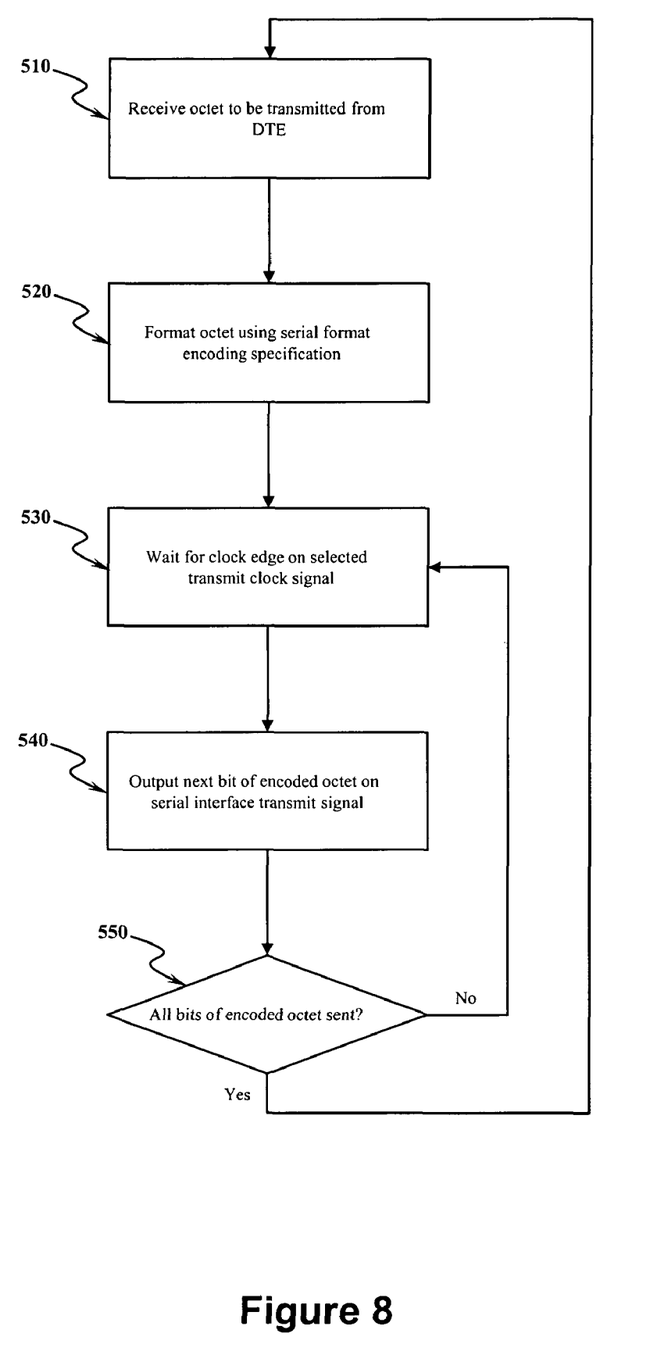
FIG. 8 depicts a flow diagram of the steps for transmitting data via synchronous serial interfaces.

Driver 272 (see FIG. 3) software executes the following steps, shown in FIG. 8: an octet to be transmitted is received 510 from the CPU 100 (see FIG. 1); the octet is formatted into an internal buffer according to the encoding method specified for the currently-used framing format 520; when a clock edge is detected 530 on selected transmit clock signal 241 (see FIG. 3), the next bit of the internal buffer is transmitted 540 on the serial interface transmit signal 211 (see FIG. 3); if all bits in the internal buffer have been sent, the program returns to the start to receive another octet 550 from the CPU 100 (see FIG. 1).

Figure 9:
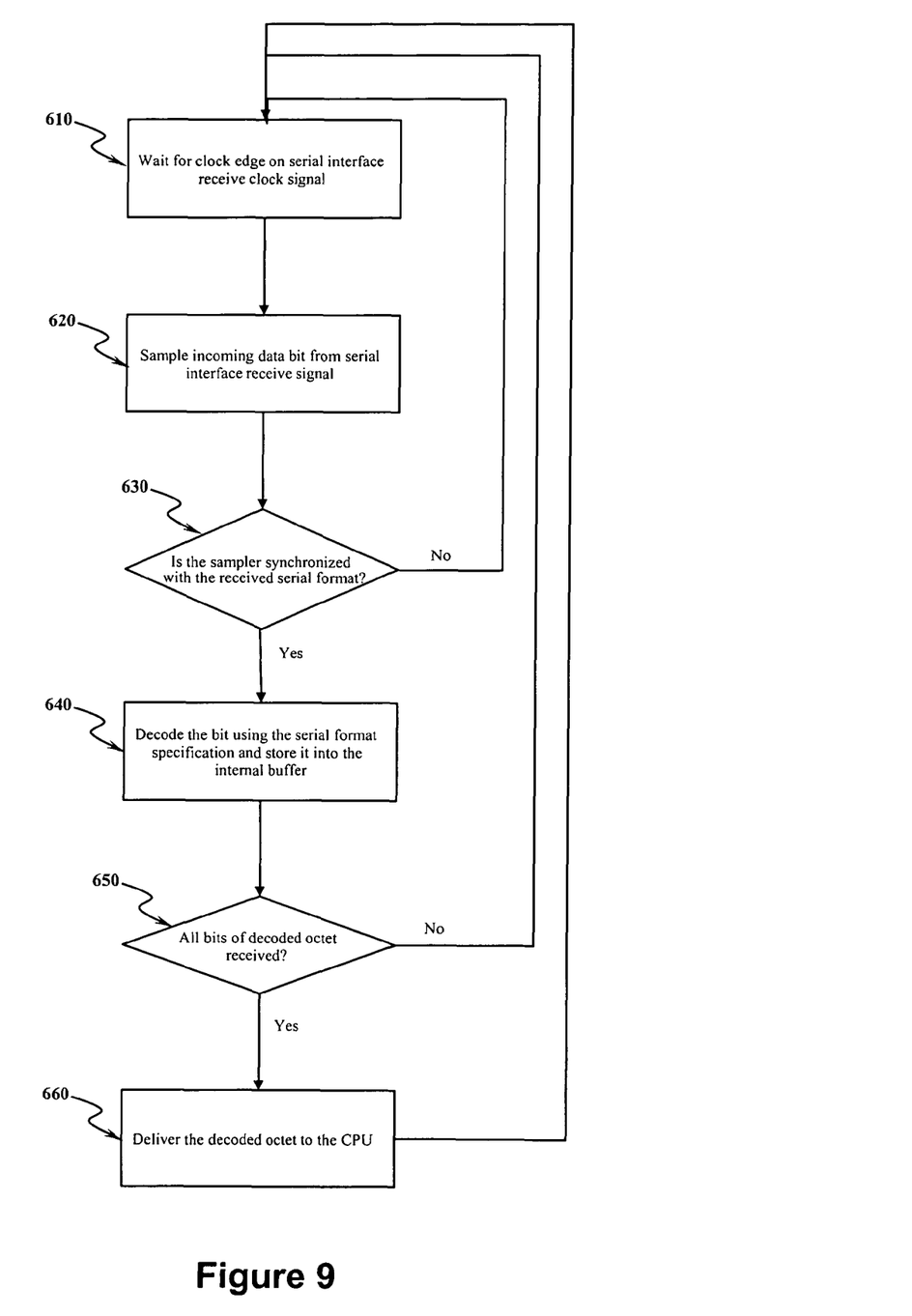
FIG. 9 depicts a flow diagram of the steps for receiving data via synchronous serial interfaces.

Sampler 271 (see FIG. 3) software executes the following steps, shown in FIG. 9: when a clock edge is detected 610 on the serial interface receive clock signal 214 (see FIG. 3), a data bit is sampled 620 from the serial interface receive signal 212 (see FIG. 3); if sampler 271 (see FIG. 3) has synchronized itself with the incoming data stream, the program continues, otherwise it returns to the start 630; the incoming bit is decoded 640 based on the rules specified in the currently-used framing format and combined with the other bits in the internal buffer; if sampler 271 (see FIG. 3) has received a complete octet of data 650, it delivers the decoded octet to the CPU 660; and the program returns 610 to waiting to receiving another bit.

Figure 10:
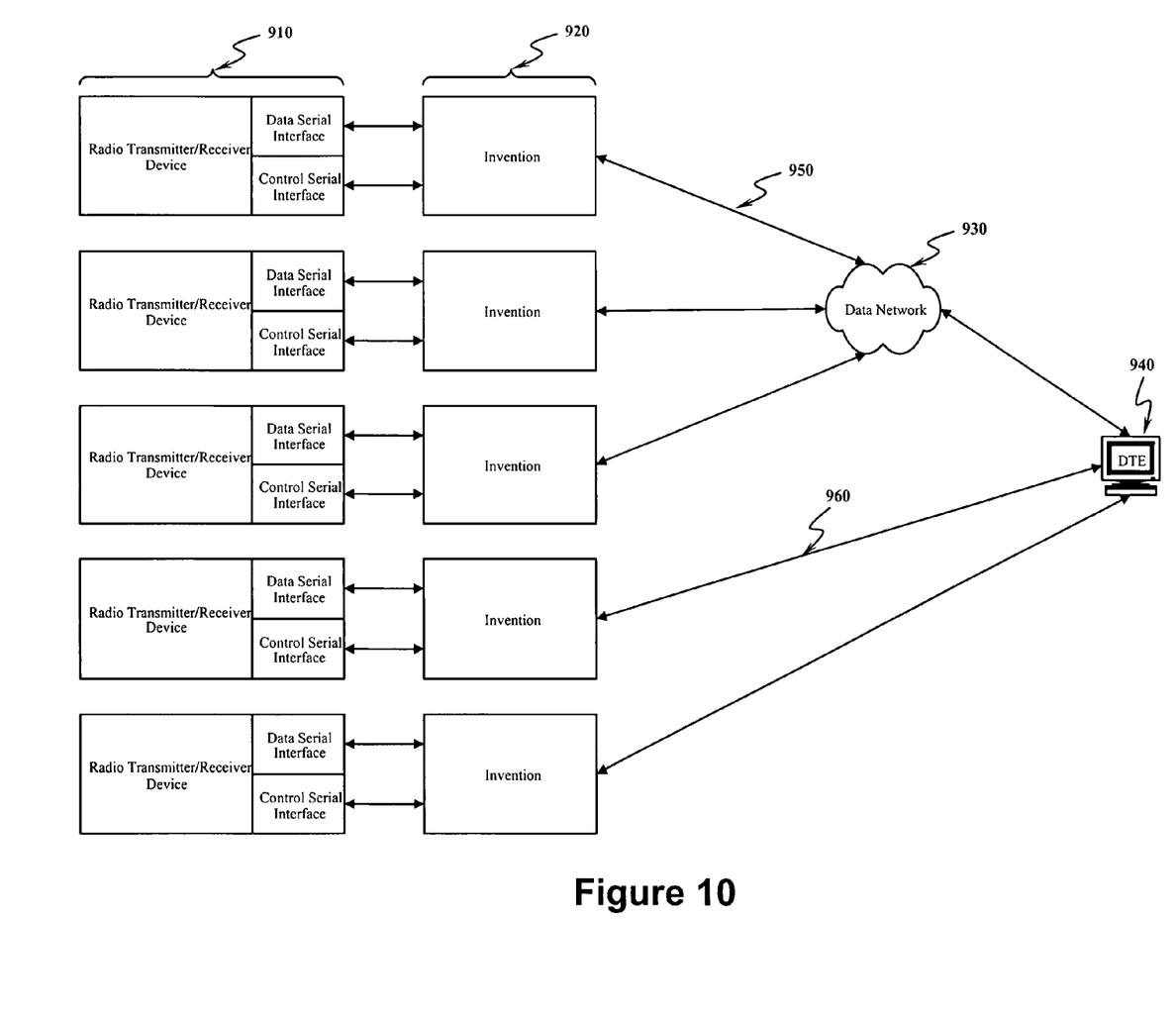
FIG. 10 depicts a typical application scenario for the present invention.

FIG. 10 depicts a typical application scenario for the present invention. One or more radio transmitter/receiver devices with data capability 910 are each attached to the invention 920 via both the radio data serial interface and the radio control serial interface, and the functionality of the radio transmitter/receiver devices is exposed to the DTE 940. The invention may be connected to the DTE through a data network 930 using a network link 950, or the invention may be connected through a direct link 960 such as USB or asynchronous serial.

While the preferred embodiments have been described and illustrated, be it known and understood that the present invention is not limited to those precise embodiments described herein, and that various substitutions, equivalents, adaptations and modifications of the invention may be made thereto by those skilled in the art without departing from the spirit and scope of the invention as defined by the appended claims. Accordingly, it is to be understood that the present invention has been described by way of illustration and not limitation.

What is claimed is:

1. A method for providing software control of a half duplex radio transceiver-to-data terminal equipment (DTE) interface so as to accomplish half duplex digital communications, comprising the steps of:

waiting in idle state for a command;
WHEN a command is received to activate said transceiver, THEN checking if data is currently being received;
WHEN data is not currently being received, THEN sending a command acknowledgement to said DTE;
activating a push-to-talk (PTT) signal;
waiting for a predetermined transceiver ramp-up period; and returning to said step of waiting in idle state;
OTHERWISE, waiting a predetermined amount of time for said transceiver to be ready to transmit OTHERWISE, continuing to wait in idle state for a command;
WHEN a command is received to send data via said transceiver, THEN copying said data from said DTE and buffering said data in transceiver; and
returning to said step of waiting in idle state;

OTHERWISE, continuing to wait in idle state for a command;
WHEN a command is received to deactivate transceiver, THEN flushing remaining data from a transceiver buffer;
checking for said transceiver buffer to empty; IF said transceiver buffer is not empty, THEN returning to said step of flushing OTHERWISE, sending an acknowledgement to said DTE that transceiver buffer is empty;
waiting a predetermined period of time for transceiver to become idle;
deactivating said push-to-talk (PTT) signal; and
returning to said step of waiting in idle state;
OTHERWISE, continuing to wait in idle state for a command; and WHEN a command is received to query configuration parameters and statistics of said transceiver, THEN querying and storing said configuration parameters and statistics;
sending an acknowledgement and value of said parameters and said statistics to said DTE;
and returning to said step of waiting in idle state; OTHERWISE, continuing to wait in idle state for a command.

2. Method of claim 1, further comprising a method for driving data, comprising the steps of:
receiving a set of data bits to be transmitted from said DTE;
formatting said set of data bits into an internal buffer in accordance with an encoding scheme;
detecting a clock edge of a transmit clock signal;
transmitting the next bit of an internal buffer on a serial interface transmit signal upon detecting said clock edge of transmit clock signal; and
IF all bits of said internal buffer have been sent, THEN
returning to said step of receiving a set of data bits to be transmitted from said DTE;
OTHERWISE, returning to said step of detecting a clock edge of a transmit clock signal.

3. Method of claim 1, further comprising a method for synchronously sampling data, comprising the steps of:
detecting a clock edge of a receive clock signal;
sampling an incoming data bit from a serial receive signal;
IF the sampling process is synchronized with said receive signal data stream, THEN
decoding said incoming data bit according to a framing format; and
storing said decoded data bit in an internal buffer;
OTHERWISE, returning to said step of detecting a clock edge of a receive clock signal;
IF a complete set of data bits has been decoded, THEN
deliver said decoded set of data bits to said DTE; and
returning to said step of detecting a clock edge of a receive clock signal;
OTHERWISE,
returning to said step of detecting a clock edge of a receive clock signal.

4. Wherein said set of data bits of claim 2 is an octet.
5. Wherein said set of data bits of claim 3 is an octet.

* * * * *